United States Patent
Haberman et al.

(10) Patent No.: US 7,185,113 B1
(45) Date of Patent: Feb. 27, 2007

(54) SYSTEM AND METHOD FOR ESTABLISHING A VIRTUAL CIRCUIT IN AN ATM NETWORK

(75) Inventors: Randy Haberman, Arlington, TX (US); David Hayes, Dallas, TX (US); Steve Herlocher, Rowlett, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/002,187

(22) Filed: Dec. 31, 1997

(51) Int. Cl.
*G06F 15/16* (2006.01)

(52) U.S. Cl. .................. 709/250; 709/226; 709/252

(58) Field of Classification Search .............. 370/17, 370/401, 337, 233, 396, 352, 395; 709/238, 709/200, 226, 252, 203, 224, 218, 229, 231, 709/250, 249, 223; 395/188.01; 707/104.38
See application file for complete search history.

(56) References Cited

U.S. PATENT DOCUMENTS

| | | | | | |
|---|---|---|---|---|---|
| 5,519,689 | A | * | 5/1996 | Kim ........................... | 370/17 |
| 5,630,061 | A | * | 5/1997 | Richter et al. .............. | 709/200 |
| 5,673,263 | A | * | 9/1997 | Basso et al. ................ | 370/396 |
| 5,701,416 | A | * | 12/1997 | Thorson et al. ............. | 709/238 |
| 5,720,032 | A | * | 2/1998 | Picazo, Jr. et al. .......... | 709/250 |
| 5,748,890 | A | * | 5/1998 | Goldberg et al. ...... | 395/188.01 |
| 5,764,639 | A | * | 6/1998 | Staples et al. .............. | 370/401 |
| 5,790,806 | A | * | 8/1998 | Koperda ..................... | 709/252 |
| 5,805,816 | A | * | 9/1998 | Picazo, Jr. et al. .......... | 709/223 |
| 5,812,545 | A | * | 9/1998 | Liebowitz et al. .......... | 370/337 |
| 5,838,663 | A | * | 11/1998 | Elwalid et al. ............. | 370/233 |
| 5,870,555 | A | * | 2/1999 | Pruett et al. ................ | 709/223 |
| 5,892,763 | A | * | 4/1999 | Laraqui et al. ............. | 370/395 |
| 6,014,700 | A | * | 1/2000 | Bainbridge et al. ......... | 709/226 |
| 6,018,721 | A | * | 1/2000 | Aziz et al. ..................... | 705/35 |

OTHER PUBLICATIONS

Venkateswaran et al. Hier Archical Multicast Routing in ATM Network. IEEE 4/1996, Apr. 1996.*
Venkateswaran et al. A Scalable Dynamic Multicast Routing Algorithm in ATM Network IEEE 8/97, Aug. 1997.*

* cited by examiner

*Primary Examiner*—Thong Vu (57) ABSTRACT

System and method for establishing a virtual circuit from a client, through an ATM network, to any one of a plurality of servers forming a functional group. The present invention operates as a peer group leader within the ATM network, routing virtual circuits when a routing request is received. The present invention selects an operation server from the functional group, computes a route from the client to the selected server, and returns the route in a designated transit list.

29 Claims, 5 Drawing Sheets

SYSTEM AND METHOD FOR ESTABLISHING A VIRTUAL CIRCUIT IN AN ATM NETWORK

BACKGROUND OF THE INVENTION

1. Field of the Invention

The present invention is directed to a telecommunications network and, in particular, to a system and method for establishing a virtual circuit in an ATM network.

2. Related Art

Computer networks often are designed to connect "client" systems with "server" systems. A client is a device and/or software that requests information from a server. A client may be a computer system or process, for example. The server is typically a shared computer in which data is stored and from which data is distributed. A server may be a computer program, a database system, or a computer system, for example. The server provides a service to clients utilizing a "client-server model."

According to the client-server model, the client connects to the server, sends a request (or query) to the server, and waits for a response from the server. The client may request that the server perform a computation, retrieve a file, or search a database for a particular entry, for example. It is not uncommon for the client to subsequently translate the server's response into a format that a human can understand.

Computer networks are often designed with multiple servers to increase network reliability. Those skilled in the art will recognize that server redundancy decreases the disruption felt by the network when one or more servers fail. When failure does occur, client queries can be redirected to alternate servers capable of handling the queries.

Many networks today employ an asynchronous transfer mode (ATM) scheme for network communication. ATM networks are particularly useful in today's multi-vendor environment where applications have different performance, quality, and business requirements, but which utilize the same computer, multiplexer, router, switch, and/or network.

Routing of queries in an ATM network is based on virtual circuit routing. A virtual circuit is a circuit that appears to the client and to the server to be a dedicated point-to-point circuit. An ATM network must establish a path from the client to the server (i.e., the virtual circuit) before client/server communication can begin. The ATM network establishes a virtual circuit after receiving a request for connection from a client. The request for connection includes an address which identifies the desired server to the ATM network. Through a private network-to-network interface (PNNI) routing process, the ATM network selects the best path through the network from the requesting client to the desired server. These conventional ATM routing techniques are well known to those skilled in the art.

Conventional ATM routing performs poorly where the desired server has failed or is otherwise unavailable. Queries must be routed to a new server capable of handling the query. Some clients may not be capable of selecting a new server-these clients may not have their queries answered. Other clients may be capable of selecting a new server, but doing so requires additional time and the client must maintain a list of all currently available servers and their addresses. What is needed, therefore, is a system and method for establishing a virtual circuit in an ATM network to any one of a set of suitable servers without the client having to know either the status or address of suitable servers.

SUMMARY OF THE INVENTION

The present invention is directed to a system and method for establishing a virtual circuit from a client through an ATM network to a server, where the server is selected from a group of servers. The client requesting the virtual circuit need not know the individual address of any of the servers in the group, only the address of the group itself. Selection of a particular server is transparent to the client-the ATM network is responsible for selecting a server from the group identified by the client.

One advantage of the present invention is that clients are not responsible for selecting an alternate server in the event of server failure. According to the present invention, routing decisions are made at the network level rather than by the client. When a request for connection is received from a client, a virtual circuit is established between the client and a server from the selected functional group which is known to be operational. The client is therefore relieved of the responsibility of handling failed requests for connection.

Another feature of the present invention is that connections to servers within a particular functional group may be distributed according to a desired criteria. In a preferred embodiment, connections may be distributed according to the processing load carried by each server in a functional group-servers receive requests for connection at a rate inversely proportional to their current processing load. This allows queries directed to a particular functional group to be distributed to servers able to respond most quickly, thereby maximizing the performance of the ATM network.

Yet another feature of the present invention is that the client need not know the address of each server in the ATM network. The client need only know the address of a functional group of servers. The addresses of individual servers within each functional group may therefore be modified without requiring that new addresses be stored at each client.

Further features and advantages of the invention, as well as the structure and operation of various embodiments of the invention, are described in detail below with reference to the accompanying figures. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

I. Overview of the Invention

The present invention is directed to a system and method for establishing a virtual circuit in an ATM network. According to the present invention, a client transmits a request for a virtual circuit (i.e., a request for connection) to an ATM network. The request specifies an address identifying a group of servers which are all capable of providing a desired function (i.e., a functional group).

Upon receiving the request for connection, the network of the present invention selects a suitable server from the identified functional group. Importantly, the selection of a particular server is made at the network level, rather than by the client. The network then creates a virtual circuit connecting the client to the selected server. Communication between the client and server may then proceed according to standard ATM techniques.

II. ATM Network Environment

The present invention is suitable for operation in an ATM network environment. As is well known to those skilled in the art, ATM networks use various communication protocols, depending generally upon the type of devices which are communicating: network-to-network interface (NNI) signaling protocol is used between ATM switches, user-to-network interface (UNI) signaling protocol is used between clients/servers and the ATM network, and private-network-to-network interface (PNNI) routing requests are used by ATM switches to determine proper routing for the virtual circuit.

The present invention is described herein in the context of an ATM network environment. It should be understood, however, that the present invention is not limited to this environment. Those skilled in the art will recognize that the present invention can operate within other network environments following protocols similar to the ATM network protocol, such as a TCP/IP network protocol.

Figure 1:
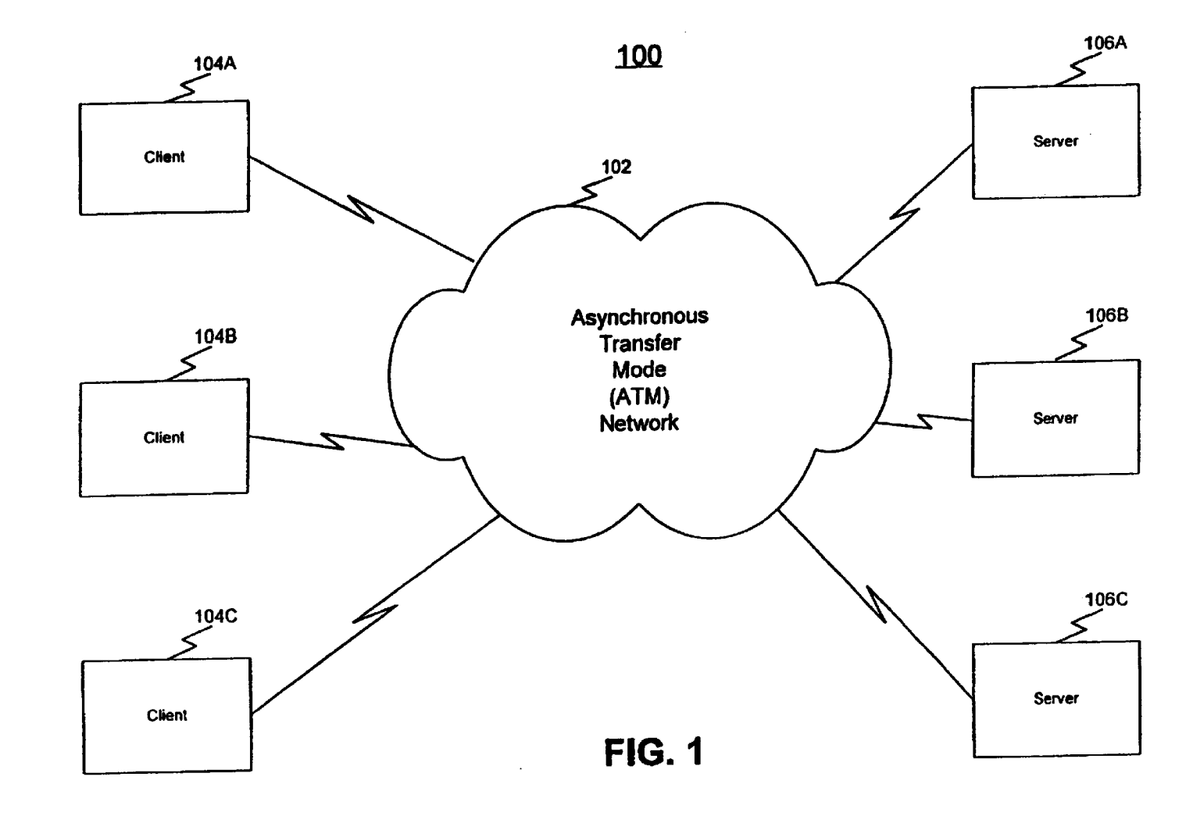
FIG. 1 is a block diagram of a network environment within which the present invention is used.

FIG. 1 is a block diagram of an example network environment 100 suitable for implementation of a preferred embodiment of the present invention. Network environment 100 includes an ATM network 102, clients 104 (indicated by reference numbers 104A through 104C), and servers 106 (indicated by references numbers 106A through 106C). Clients 104 and servers 106 communicate bi-directionally with ATM network 102. This example network environment is now described.

Clients 104 communicate with servers 106 via ATM network 102. According to the present invention, clients 104 and servers 106 interact in a conventional client/server relationship well known to those skilled in the art. However, ATM network 102 does not recognize a difference between clients 104 and servers 106. ATM network 102 is concerned with the transmission of data, without regard to which system is the "client" and which is the "server". Consequently, clients 104 and servers 106 are so designated to indicate their relationship to each other, but are interchangeable so far as ATM network 102 is concerned.

As is known to those skilled in the art, clients 104 may contact a server 106 for many different purposes. Clients 104 and servers 106 may also be implemented in many different ways, so long as both are able to communicate via ATM network 102. For example, client 104 represents a travel agent's airplane reservation system, and server 106 represents a central booking computer. Alternatively, client 104 represents a point-of-sale cash register, and server 106 represents a computer tasked with tracking inventory and sales. Alternatively still, client 104A represents a gas pump with a credit card reader, and server 106 represents a credit checking computer.

Figure 2:
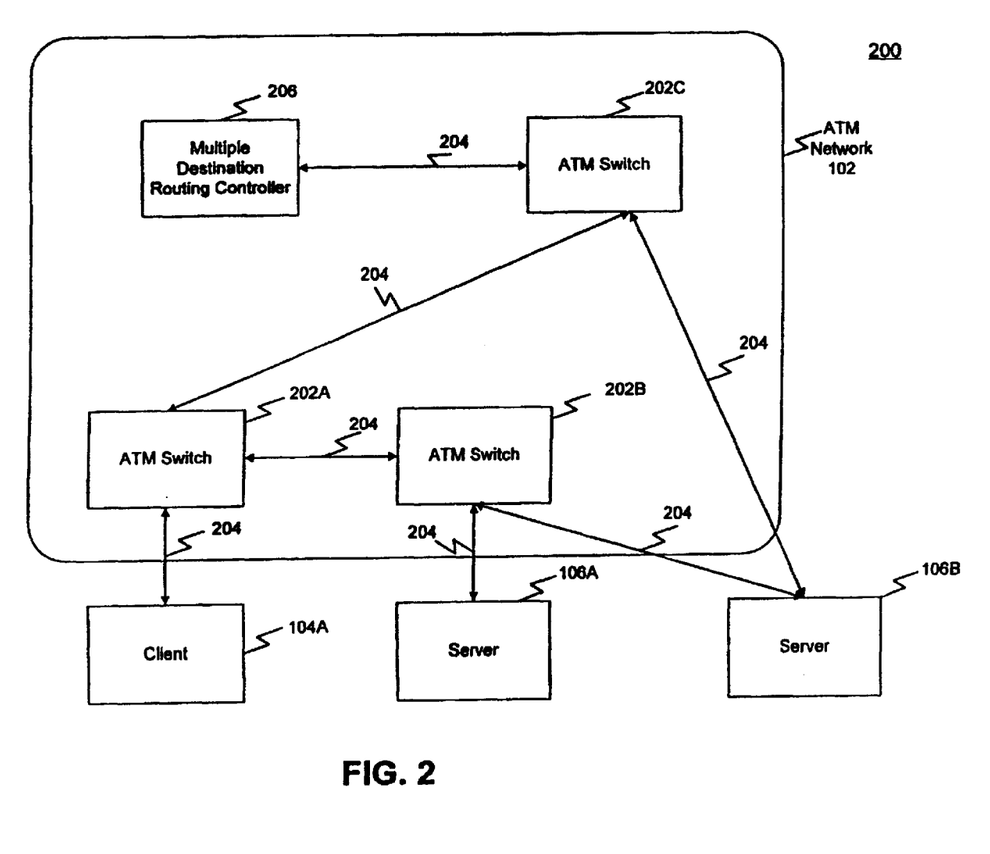
FIG. 2 is a block diagram illustrating a network environment in more detail.

FIG. 2 is a more detailed illustration of network environment 100. ATM network 102 includes ATM switches 202 interconnected by communication pathways 204, and a multiple destination routing controller 206.

ATM switch 202 in a preferred embodiment is a conventional ATM switch. Alternatively, ATM switches 202 can be implemented using any network elements that are compatible with ATM technology, including NNI signaling protocol and PNNI routing protocol.

Communication pathways 204 represent bidirectional point-to-point channels between clients 104, servers 106, and ATM switches 202. Communication pathways 204 support UNI or NNI signaling protocol as appropriate. As is well known to those skilled in the art, communications between an ATM switch 202 and an end-user (i.e., a client or server) conventionally follow a UNI signaling protocol. Conversely, communications between ATM switches 202 conventionally follow a NNI signaling protocol. Communication pathway 204 therefore represents a bidirectional communication link which supports the signaling protocol appropriate to the devices connected to the link.

Multiple destination routing controller 206 is connected to the network of ATM switches 202 via one or more communication pathways 204. FIG. 2 depicts a single communication pathway 204 between multiple destination routing controller 206 and ATM switch 202C. However, those skilled in the art will recognize that multiple communication pathways 204 could be used to provide redundancy and enhanced network reliability. The operation of multiple destination routing controller 206 is described in detail below.

III. Conventional ATM Routing

Conventional ATM routing is now described in terms of a simple example. Referring to FIG. 1, assume in this example that client 104A is a gas pump with a credit card reader that wishes to ask server 106A "Is this credit card valid?" in response to customer's request to purchase gas with a credit card.

Communications between clients and servers via ATM network 102 may be analogized to a telephone call. Before any client/server communication can take place, client 104A must establish a virtual circuit to server 106A. In terms of the telephone call analogy, client 104A calls server 106A and server 106A answers the call. In answering the call, server 106A accepts the incoming virtual circuit and a communication path is established over which client 104A and server 106A can interact. Client 104A can now make the query "Is this credit card valid?" for example, and server 106A can answer the query.

Those skilled in the art will recognize that any end-user device (e.g., client or server) can request a virtual circuit to any destination. In the context of the current invention, however, most virtual circuit requests come from client systems.

With conventional ATM networks, clients 104 must know the ATM address of the server 106 with which they wish to connect. This characteristic is analogous to conventional telephony, wherein the calling party must know the telephone number of the called party. Further, no two end-users have the same ATM address. Servers and clients each have a unique ATM address. Accordingly, in order to request a virtual circuit between them, client 104A specifies the ATM address of server 106A.

According to conventional PNNI routing, ATM network 102 selects the best route through ATM network 102 for a virtual circuit from client 104A to server 106A. Referring to FIG. 2, one possible route from client 104A to server 106A would be through ATM switches 202A and 202B. If, on the other hand, client 104A wanted to establish a virtual circuit to server 106B, then one possible route would be from client 104A to ATM switch 202A to ATM switch 202B to server 106B. Another route would be from client 104A to ATM switch 202A to ATM switch 202C and to server 106B. In either case, ATM network 102 uses the PNNI routing process to select the best route through ATM network 102 from client 104A to server 106A or to server 106B.

Conventional PNNI routing procedures associate ATM switches into "peer groups" in order to create a routing hierarchy. Peer groups typically contain only a few ATM switches. Large ATM networks are constructed by combining peer groups together into larger peer groups. The PNNI routing protocol organizes the peer groups into a layered hierarchy. The use of peer groups organized into multiple hierarchical levels is well known to those skilled in the art, and will not be discussed in detail herein.

According to conventional ATM technology, one ATM switch in each peer group is designated the "peer group leader." The peer group leader is responsible for maintaining the topology of all ATM switches in its peer group. Additionally, the peer group leader also represents its peer group to higher layers in the routing hierarchy. If an ATM switch in a peer group receives a request for a virtual circuit and does not already know the correct route, the ATM switch asks the peer group leader to determine the route.

Consider again the example described above wherein client 104A wishes to establish a virtual circuit to server 106A. Suppose that ATM switch 202C is the peer group leader for a peer group consisting of ATM switch 202A, ATM switch 202B, and ATM switch 202C. Client 104A transmits to ATM switch 202A a request for connection with server 106A, including server 106A's ATM address. Suppose further that ATM switch 202A does not already know a route for a virtual circuit from client 104A to server 106A. ATM switch 202A asks peer group leader ATM switch 202C to determine a route from client 104A to server 106A.

A limitation of conventional ATM routing is that if server 106A is not operational because of a failure, because of having been removed from service for routine maintenance or for some other reason, client 104A is typically unaware of this status of server 106A. If client 104A is not capable of selecting a new server, then client 104A may be unavailable to serve customers. That is, the gas pump credit card reader will be out of service, for example.

If, on the other hand, client 104A is capable of selecting a new server, then client 104A may do so. However, time is wasted between determining that server 106A is unavailable and selecting the secondary server. In any event, client 104A may not know the individual ATM address for the secondary server.

Selecting a new server may also be complicated by the fact that typically client 104A does not have a view of the current conditions in the entire ATM network. Client 104A generally does not have access to the dynamic status of the network. Knowing the status and ATM address of a particular secondary server at any given point in time would require the client to maintain an up-to-date listing of all currently available servers and their addresses. Status information could be distributed to client 104A, but this would increase the complexity and expense of client systems. Moreover, this distribution of the information would add to the load on ATM network 102. The extra load would diminish ATM network 102's capacity to carry queries.

IV. Functional Groups within an ATM Network

According to the present invention, client 104A sends to ATM network 102 a request for connection. The request for connection differs from a conventional request in that it specifies an address of a functional group of servers, rather than a particular individual server. ATM network 102 selects a server from the specified functional group and connects client 104A to that server. This is advantageous to client 104A because ATM network 102 has a better view of current network activity and status than client 104A. Accordingly, ATM network 102 can base a selection decision on factors not available to client 104A, such as the current processing load carried by each server. The following section provides further details related to server selection and routing.

According to the present invention, servers 106 are grouped according to the functions they perform. Each server 106 in a particular functional group must be able to service any request from a client 104 sent to the group. The present invention assumes that any operational server within a functional group may be selected to service a client query sent to that group. For example, several servers may be grouped together to verify credit card purchases at gas pumps. Each server in the group must be able to process credit card queries sent to that group.

Each functional group is assigned a unique ATM address. For example, a group of servers validating credit cards may be assigned an ATM address of 0000.0000.0001. Similarly, a group of servers handling toll-free routing information may be assigned an ATM address of 0000.0000.0002. The ATM functional group addresses may be chosen arbitrarily and assigned at the convenience of an administrator of ATM network 102.

Each server in a functional group is configured to respond to the ATM functional group address. A single server may be included within more than one functional groups, so long as that server is capable of servicing client queries sent to each of the groups. Servers may therefore respond to two or more ATM addresses: their individual ATM address, and the address of each functional group to which they belong.

For example, referring to FIG. 2, suppose that server 106A has a device address of 0000.0000.0010, server 106B has a device address of 0000.0000.0020, and the functional group consisting of 106A and 106B has a functional group address of 0000.0000.0030. According to the present invention, server 106A responds to the address 0000.0000.0010 as well as to the address 0000.0000.0030. Likewise, server 106B responds to the address of 0000.0000.0020 as well as to the address of 000.0000.0030.

V. Operation of Multiple Destination Routing Controller

Figure 3:
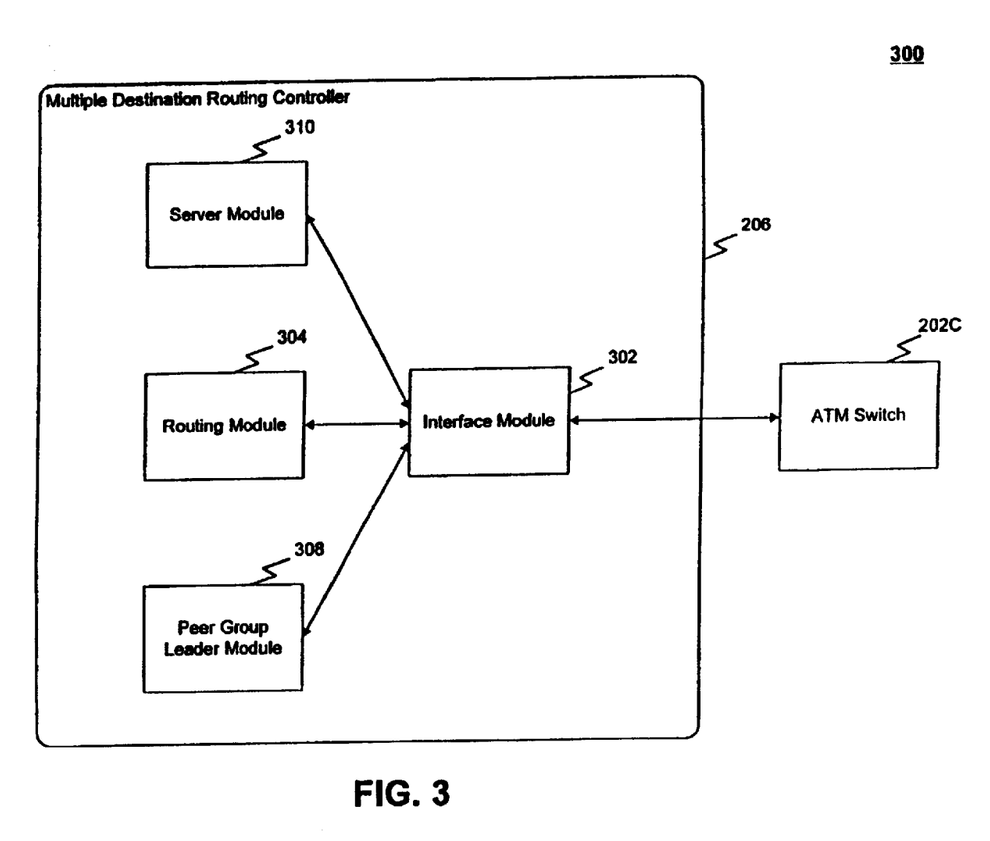
FIG. 3 is a block diagram illustrating the software components of a multiple destination routing controller.
Figure 4:
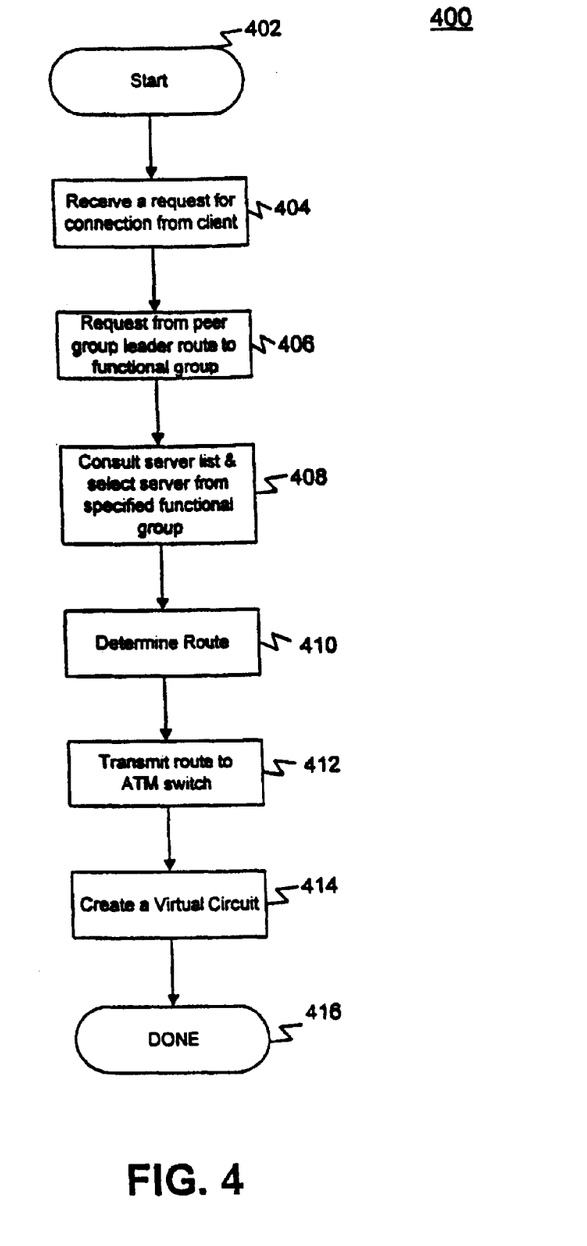
FIG. 4 is a flowchart of the operation of a preferred embodiment of the invention.

The operation of multiple destination routing controller (MDRC) 206 will be now described with reference to FIGS. 3 and 4. FIG. 3 is a block diagram 300 depicting the various software components of MDRC 206: an interface module 302, a routing module 304, a peer group leader module 308, and a server module 310. FIG. 4 is a flowchart 400 depicting the steps performed by ATM network 102, including MDRC 206, according to a preferred embodiment.

In FIG. 3, each of these software components, or modules, represent a particular function performed by a computer under the control of computer software. Often the line between the functionality of one component and the next is arbitrarily drawn, and is described as such purely for purposes of convenience. For instance, a function described as being performed by server module 306 might equivalently be performed by interface module 302 or routing module 304. Those skilled in the art will note the importance of the function described, not the arbitrary grouping of functionality into software modules.

Those skilled in the art will recognize that creating software code based on the following functional descriptions is well within an ordinary level of skill. Those skilled in the art will also recognize that, depending upon the environment and the hardware used, different languages would be appropriate under different circumstances. Again, the choice of a particular language is well within the level of ordinary skill in the art.

Interface module 302 handles all communications between the various other software modules, and all communications outside MDRC 206. Here, interface module 302 provides the interface for communicating with ATM switch 202C. Interface module 302 is implemented as conventional input/output and control routines. Interface module 302 is shown in FIG. 3 primarily for purposes of illustrative clarity-those skilled in the art will recognize that interface module 302 could have been omitted from FIG. 3, as these are functions performed by all software routines, and can be assumed to be part of any software implementation.

Peer group leader module 308 causes ATM network 102 to elect MDRC 206 as peer group leader. According to standard ATM technology, a peer group leader is elected for each peer group. This insures that all request for routing in that peer group are directed to MDRC 206. In a preferred embodiment, peer group leader module 308 arranges to win this election by broadcasting an artificially higher preference for MDRC 206. However, those skilled in the art will recognize that there are many alternate approaches to having MDRC 206 elected peer group leader.

Another alternate approach is to manually configure ATM network 102, assigning MDRC 206 as peer group leader. In this approach, peer group leader module 308 no longer is necessary to insure that MDRC 206 is elected peer group leader. However, those skilled in the art will recognize that other functions may still need to be performed according to ATM protocol, such as periodically broadcasting "keep-alive" packets to all members of the peer group.

Referring now to FIG. 4, flowchart 400 illustrates the operation of ATM network 102 according to a preferred embodiment of the present invention, including the operation of MDRC 206. These steps will be described in the context of the example outlined above, where client 104A wishes to contact a server capable of providing a particular service, such as authorizing a credit card purchase. For purposes of this example, assume that servers 106A and 106B are included within a functional group which provides this service. Assume that client 104A has sent a request for connection to ATM switch 202A specifying this functional group. Further assume that, prior to the request for connection being sent, peer group leader module 308 has caused MDRC 206 to be elected peer group leader of the peer group including ATM switches 202A, 202B, and 202C.

In step 404, ATM switch 202A receives a request for connection from client 104A, as mentioned above. Since the functional group address does not belong to any actual physical device, ATM switch 202A cannot itself determine a route to establish a virtual circuit. Following conventional procedures of PNNI, in step 406 ATM switch 202A sends a routing request to the peer group leader, which in this case is MDRC 206, requesting a route to the functional group address.

Interface module 302 receives the routing request from ATM switch 202A, via ATM switch 202C. As peer group leader, MDRC 208 must handle all PNNI routing requests from the peer group, both those specifying a functional group address, and those specifying a conventional ATM address.

Routing module 304 determines routings through ATM network 102 according to conventional ATM technology. For instance, routing module 304 can determine a routing between client 104A and server 106A. When a routing request is received specifying a conventional ATM address, routing module 304 determines an appropriate routing, and returns the routing to the requesting ATM switch 202, which then sets up a virtual circuit according to the routing.

However, routing requests which specify a functional group address are handled differently. Server module 310 maintains a list of the servers assigned to each functional group, including each server's individual ATM address. In a preferred embodiment, the network administrator provides this list to server module 310. Server module 310 also uses conventional techniques to automatically maintain this list by determining which of the servers are actually able to respond at any given moment. This list is updated periodically according to conventional techniques.

In step 408, server module 310 consults the list of servers and selects a server to service client 104A from the functional group specified in the routing request (and in the request for connection). Server module 310 can make this selection based on a variety of criteria, depending upon the particular network environment. For instance, the server may be selected based on proximity to the requesting client, network load, available server capacity, or other application-specific factors. However, server module 310 will not select a server which is known to be unreachable.

In step 410, routing module 304 determines a route through ATM network 102, from client 104A to the server selected by server module 310, in this case server 106A. Again, this is a conventional function of PNNI routing. Routing module 304 need not deviate from conventional ATM practice. The computed route takes the form of an ATM designated transit list (DTL). As is well known to those skilled in the art, this is a list of ATM switches and communication pathways over which the new virtual circuit should be routed. The DTL is a standard PNNI message, well known to those skilled in the art. Referring to FIG. 2, an example route is from client 104A, through ATM switches 202A and 202B, to server 106A.

In step 412, interface module 302 transmits the resulting route to ATM switch 202A as a DTL. In step 414, ATM switch 202A creates a virtual circuit through the route specified in the DTL. The request for connection will arrive at the selected server, server 106A, still bearing the ATM address of the functional group. As stated above, according to the present invention each server must recognize its own ATM address as well as the ATM address of each functional group of which it is a part.

Now that a virtual circuit is established, client 104A may begin normal communications with server 106A in a conventional client/server manner.

It is important to note that the virtual circuit need not flow through multiple destination routing controller 206. According to conventional PNNI routing procedures, a DTL need not include the peer group leader within the chosen route. As a result, the peer group leader does not have to perform the functions of an ATM switch. MDRC 206 may therefore be implemented as a general purpose computer without the special capabilities of an ATM switch.

VI. Implementation of Multiple Destination Routing Controller

In a preferred embodiment, multiple destination routing controller 206 is implemented as a general purpose computer system, described in detail below. In an alternate embodiment, multiple destination routing controller 206 is implemented using a special purpose computer system. In still another embodiment, the functions of multiple destination routing controller 206 are integrated into a conventional ATM switch, such as ATM switch 202. Those skilled in the art will recognize the various tradeoffs associated with each particular implementation.

Figure 5:
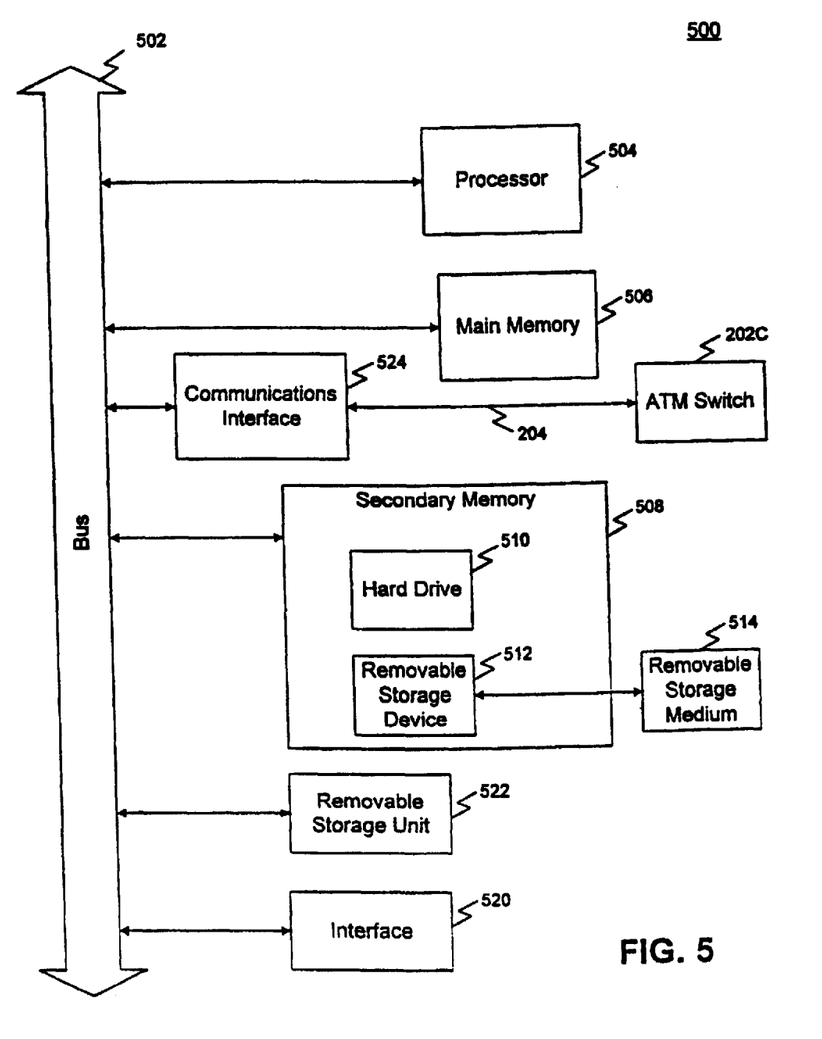
FIG. 5 is a block diagram of a computer system representing a preferred implementation of a multiple destination routing controller.

Multiple destination routing controller 206 can be implemented using hardware, software, or a combination thereof and may be implemented as a computer system or other processing system. An example computer system 500 is shown in FIG. 5. Computer system 500 includes a communication bus, such as communication bus 502, and one or more processors, such as processor 504. Processor 504 is connected to communication bus 502.

Computer system 500 also includes a main memory 506, preferably random access memory (RAM), and may also include a secondary memory 508. Secondary memory 508 may include, for example, a hard disk drive 510 and/or a removable storage device 512, representing a floppy disk drive, a magnetic tape drive, and optical disk drive, etc. Removable storage device 512 reads from and/or writes to a removable storage medium 514 in a well known manner. Removable storage medium 514 represents a floppy disk, magnetic tape, optical disk, etc., which is read from and written to by removable storage device 512. As will be appreciated, removable storage medium 514 includes a computer usable storage medium having stored therein computer software and/or data.

In alternate embodiments, secondary memory 508 may include other similar means for allowing computer programs or other instructions to be loaded into computer system 500. Such means can include, for example, a removable storage unit 522 and an interface 520. Examples of such can include a program cartridge and cartridge interface (such as that found in video game devices), a removable memory chip (such as an EPROM or PROM) and associated socket, and other removable storage units 522 and interfaces 520 which allow software and data to be transferred to computer system 500.

Computer system 500 includes a communications interface 524. Communications interface 524 allows software and data to be transferred between computer system 500 and the ATM network 102. Examples of communications interface 524 can include a modem, a network interface (such as an Ethernet card), a communications port, a PCMCIA slot and card, etc. Software and data transferred via communications interface 524 are in the form of signals which can be electronic, electromagnetic, optical or other signals capable of being received by communications interface 524. These signals are provided to communications interface via communications pathway 204.

In this document, the terms "computer program medium" and "computer usable medium" are used to generally refer to media such as removable storage device 518 and hard disk installed in hard disk drive 510. These computer program products are means for providing software to computer system 500.

In an alternate embodiment, the invention is implemented using computer programs (or software). Computer programs (also called computer control logic) are stored in main memory 506 and/or secondary memory 508. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In the embodiment where the invention is implemented using software, the software may be stored in a computer program product and loaded into computer system 500 using removable storage device 512, hard drive 510 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. Conclusion

While the invention has been particularly shown and described with reference to preferred embodiments thereof, it will be understood by those skilled in the art that various changes in form and details may be made therein without departing from the spirit and scope of the invention.

What is claimed is:

1. A method for establishing a virtual circuit from a client to one of a plurality of servers through a network, comprising the steps of:

(1) receiving a request for connection from a client, wherein said request specifies a functional group having a unique ATM address, and wherein said functional group includes a plurality of servers, each capable of servicing said client, and wherein each of said plurality of servers are assigned a unique ATM address;

(2) selecting a server capable of satisfying said request from said functional group, wherein said selection is transparent to said client;

(3) computing a route to said server; and (4) establishing a virtual circuit from said client to said server via said route.

2. The method of claim 1, wherein said step of selecting a server further comprises selecting an operational server from said functional group which has the highest available computational power.

3. The method of claim 1, wherein said client is a telephone switching system.

4. The method of claim 1, wherein said network is an ATM network.

5. The method of claim 1, wherein said network is a TCP/IP network.

6. A system for establishing a virtual circuit from a client to one of a plurality of servers through a network, comprising:

an interface module coupled to receive a routing request from the network, wherein said routing request specifies a functional group and a client, said functional group having a unique ATM address, and wherein said functional group includes a plurality of servers, each of said plurality of servers, are assigned a unique ATM address and is capable of servicing said client;

a server module configured to select a server capable of satisfying said routing request from said functional group, wherein said selection is transparent to said client;

a routing module configured to determine a route from said client to said server through the network.

7. The system of claim 6, wherein said network is an ATM network.

8. The system of claim 7, wherein said system further comprises:

a peer group leader module configured to cause the network to elect said system as a peer group leader.

9. The system of claim 7, wherein each of said plurality of servers responds to an ATM address for said functional group.

10. The system of claim 6, wherein said server module is configured to select an operational server from said functional group which has the highest available computational power.

11. The system of claim 6, wherein said server module is further configured to maintain a list of functional groups within the network.

12. The system of claim 6, wherein said client is a telephone switching system.

13. The system of claim 6, wherein the network is a TCP/IP network.

14. A computer program product comprising a computer useable medium having a computer program logic stored therein, wherein said computer program logic comprises:

interface means for enabling a computer to receive request from a network, wherein said routing request specifics a functional group and a client, said functional group having a unique ATM address and wherein said functional group includes a plurality of servers, each of said plurality of servers, is assigned a unique ATM address, and is capable of servicing said client;

server means for enabling said computer to select a server capable of satisfying said request from said functional group, wherein said selection is transparent to said client; and routing means for enabling said computer to determine a route from said client to said sever through said network.

15. The computer program product of claim 14, wherein said network is an ATM network.

16. The computer program product of claim 15, wherein said computer program logic further comprises:

a peer group leader means for enabling said computer to cause said ATM network to elect said system as a peer group leader.

17. The computer program product of claim 15, wherein each of said plurality of servers responds to an ATM address for said functional group.

18. The computer program product of claim 14, wherein said network is a TCP/IP network.

19. The computer program product of claim 14, wherein said server means enables said computer to select an operational server from said functional group which has the highest available computational power.

20. The computer program product of claim 14, wherein said server means further enables said computer to maintain a list of functional groups within said network.

21. The computer program product of claim 14, wherein said client is a telephone switching system.

22. A computer, comprising:

a processor;

interface means for enabling said processor to receive a routing request from a network wherein said routing request specifies a functional group and a client, said functional group having a unique ATM address, and wherein said functional group includes a plurality of servers, each of said plurality of servers, is assigned a unique ATM address, and is capable of servicing said client;

server means for enabling said processor to select a server capable of satisfying said routing request from said functional group, wherein said selection is transparent to said client; and routing means for enabling said processor to determine a route from said client to said server through said network.

23. The computer of claim 22, wherein said network is an ATM network.

24. The computer of claim 23, wherein said computer further comprises:

a peer group leader means for enabling said processor to cause said ATM network to elect said system as a peer group leader.

25. The computer of claim 23, wherein each of said plurality of servers responds to an ATM address for said functional group.

26. The computer of claim 22, wherein said network is a TCP/IP network.

27. The computer of claim 22, wherein said server means enables said processor to select an operational server from said functional group which has the highest available computational power.

28. The computer of claim 22, wherein said server means further enables said processor to maintain a list of functional groups within said network.

29. The computer of claim 22, wherein said client is a telephone switching system.

* * * * *